United States Patent Office 2,927,881
Patented Mar. 8, 1960

2,927,881

DIMETHYL-2,2,2-TRICHLORO-1-N-BUTYRYL-OXYETHYLPHOSPHONATE

John E. Casida and Belton Wayne Arthur, Madison, Wis., assignors to Wisconsin Alumni Research Foundation, Madison, Wis., a corporation of Wisconsin No Drawing. Application December 17, 1956
Serial No. 628,511

3 Claims. (Cl. 167—22)

The present invention relates to the insecticide field and more specifically to a novel compound characterized by high insecticidal activity coupled with relatively low mammalian toxicity.

The $\beta,\beta,\beta$-trichloro-$\alpha$-hydroxyethylphosphonic dimethyl ester and its preparation is described in the Lorenz Patent No. 2,701,225. This product which is known in the art as dipterex and also as Bayer L 13/59 and can be termed chemically dimethyl-2,2,2-trichloro-1-hydroxy-ethylphosphonate is a potent insecticide and can be used in insecticide carriers or diluents as described in the patent. The novel compound of the present invention is the n-butyryl derivative of dipterex and can be termed chemically dimethyl-2,2,2-trichloro-1-n-butyroloxyethylphosphonate. The replacement of the hydroxyl (OH) group at the 1-position on the ethyl group with a n-butyryloxy

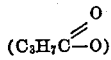

group has been found to result in an unexpected decrease in mammalian toxicity. This is illustrated by the following table.

TABLE

| Compound: | Median lethal dose mg./kg. rat |
|---|---|
| Dipterex | 400 |
| Dimethyl - 2,2,2 - trichloro - 1 - n - butyryl-oxyethylphosphonate | 3000 |
| Malathion | 1000 |

The values given in the table are approximate but are comparative and serve to point out the relative differences in toxicity. The reduction in mammalian toxicity was unexpected as the 1-propionoxy compound was found to be substantially more toxic than the 1-acetyloxy compound which in turn is about three times more toxic than the 1-n-butyryloxy compound. The iso-butyryloxy compound was also found to have a mammalian toxicity of about three times that of the 1-n-butyryloxy compound. Tests have also shown the 1-n-butyryloxy compound of the present invention to possess potent insecticidal properties, the lethal dose (mg./kg.) for flies being within the same range as dipterex. Indeed, most tests have shown the 1-n-butyryloxy compound to be, if anything, somewhat more toxic to flies than either dipterex or malathion.

The following examples will serve to illustrate the present invention.

*Example I*

About 0.1 mole of dimethyl-2,2,2-trichloro-1-hydroxyethylphosphonate is first mixed with about 0.1 mole of n-butyric anhydride and heated on a steam bath for about 8 hours. About 100 cc. of cold water is next added to the reaction mixture and the resulting aqueous mixture extracted twice with 100 ml. portions of hexane to recover the desired dimethyl 2,2,2-trichloro-1-n-butyryloxyethylphosphonate. Upon removal of the solvent by evaporation the butyrylated product is obtained as an oil and displays C=O absorption but no C—OH absorption in an infrared spectrogram.

The 1-n-butyryloxy compound of the present invention can be employed in place of dipterex in insecticidal dusts and solutions or emulsions, etc. in the same concentrations as disclosed in the Lorenz patent. The 1-n-butyryloxy compound can also be used to advantage in the following type combination formulations.

*Example II*

General household spray formula:

| | Percent |
|---|---|
| Pyrethrins | .05 |
| Technical Piperonyl butoxide | 0.10 |
| Dimethyl - 2,2,2 - trichloro - 1 - n - butyryl-oxyethylphosphonate | 2.0 |
| Petroleum distillates | 97.85 |
| | 100.00 |

*Example III*

Pressurized spray formula:

| | |
|---|---|
| Pyrethrins | 0.15 |
| Technical piperonyl butoxide | 0.50 |
| Dimethyl - 2,2,2 - trichloro - 1 - n - butyryl-oxyethylphosphonate | 2.0 |
| Alkylated naphtha | 46.75 |
| Methylene chloride | 5.0 |
| Freon 12 ($CCl_2F_2$) | 45.0 |
| Deodorized kerosene | 0.6 |

*Example IV*

Aerosol formula:

| | |
|---|---|
| Pyrethrins | .25 |
| Technical piperonyl butoxide | 1.0 |
| Dimethyl - 2,2,2 - trichloro - 1 - n - butyryl-oxyethylphosphonate | 2.0 |
| Petroleum distillates | 11.75 |
| Propellant [1] | 85.0 |

[1] Equal quantities of Freon-11 ($CCl_3F$) and Freon-12 ($CCl_2F_2$).

Other type formulations with and without petroleum distillates such as used with DDT and the like can also be employed.

We claim:

1. The compound, dimethyl - 2,2,2 - trichloro - 1 - n-butyryloxyethylphosphonate.

2. An insecticidal composition containing as an essential active ingredient dimethyl-2,2,2-trichloro-1-n-butyryloxyethylphosphonate and an insecticide carrier.

3. A composition in accordance with claim 2 where the carrier is a petroleum distillate.

References Cited in the file of this patent

UNITED STATES PATENTS

| 2,536,647 | Kosolapoff | Jan. 2, 1951 |
| 2,701,225 | Lorenz | Feb. 1, 1955 |

FOREIGN PATENTS

| 509,034 | Canada | Jan. 11, 1955 |

OTHER REFERENCES

Barthel et al.: "J. Am. Chem. Soc.," 77, 2427 (1955).